United States Patent

Minami et al.

[15] 3,673,145

[45] June 27, 1972

[54] POLYIMIDE SOLUTION AND METHOD OF PREPARING SAME

[72] Inventors: Muneyoshi Minami; Masaharu Taniguchi, both of Otsu-shi; Tadao Tsutsomi, Shiga-ken; Masakazo Murakami, Otsu-shi; Toshiya Yoshii, Otsu-ken, all of Japan

[73] Assignee: Toray Industries, Inc., Tokyo, Japan

[22] Filed: Sept. 2, 1969

[21] Appl. No.: 862,601

[30] Foreign Application Priority Data

Sept. 2, 1968 Japan.....................................43/62317
Jan. 22, 1969 Japan.....................................44/4147

[52] U.S. Cl. .................260/32.4 N, 260/30.2 R, 260/32.6 N, 260/33.4 P, 260/33.6 R, 260/78 TF
[51] Int. Cl. .....................................C08g 51/28, C08g 51/44
[58] Field of Search................260/32.6, 30.2, 78 TF, 33.4 P, 260/33.6 R, 32.4 N

[56] References Cited

UNITED STATES PATENTS

| 3,295,940 | 1/1967 | Gerow | 51/298 |
| 3,179,634 | 4/1965 | Edwards | 260/78 |
| 3,501,443 | 3/1970 | Di Leone | 260/78 |
| 3,493,540 | 2/1970 | Mueller | 260/47 |
| 3,277,043 | 10/1966 | Holub | 260/33.4 |
| 3,414,543 | 12/1968 | Paufler | 260/47 |
| 2,304,687 | 12/1942 | Hagedorn | 260/78 |

FOREIGN PATENTS OR APPLICATIONS

| 1,058,390 | 2/1967 | Great Britain |
| 849,806 | 12/1939 | France |

OTHER PUBLICATIONS

Alien Property Custodian Serial No. 389,002 Hopff et al.
New Liner Polymer, Lee et al., Nov. 1967

Primary Examiner—Morris Liebman
Assistant Examiner—Richard Zaitlen
Attorney—Paul & Paul

[57] ABSTRACT

Novel polyimide solutions are provided which are obtained by reacting 1,2,3,4-butane tetracarboxylic acid or a functional derivative thereof with an organic diamine for example an aromatic diamine such as diaminodiphenyl ether in certain reaction solvents for example phenols, nitrobenzenes, pyridines, quinolines, N-alkyl lactams and cyanobenzenes at a temperature of from 100° C. to the boiling point of the reaction mixture until a polyimide solution is obtained having an imidization ratio of 50–98 percent is obtained. The products thus obtained can be employed as varnishes, to make film coating for electric cable, as adhesives or blended with pigments and the like to make pains.

7 Claims, No Drawings

POLYIMIDE SOLUTION AND METHOD OF PREPARING SAME

BACKGROUND OF THE INVENTION

1. Field of the Invention.

This invention is concerned with certain novel polyimide solutions and the method for obtaining these polyimide solutions.

2. Description of the Prior Art.

It is known that polyimide polymers exhibit excellent heat and chemical resistance. Because of these properties the polyimide polymers are used to make electric cable coatings, paints, shaped articles, and fibers which are intended to be employed at high temperatures. Heretofore, the polyimide polymers have normally been prepared by reacting a tetracarboxylic dianhydride with an amine in a reaction solvent such as N,N-dimethyl formamide, N,N-dimethyl acetamide or N-methyl-2-pyrrolidone to first obtain a polyamide and the polyamide was then dehydrated to produce the imide polymer.

In the polymerization step employed to form the polyimides of the prior art various methods were suggested in order to obtain a high degree of polymerization, such as, using completely dehydrated solvents and carrying out the reaction in a substantially anhydrous system. The solution of polyimides produced by the prior art however had poor storage stability and were unsuitable for making baked enamel coating since it was difficult to obtain a smooth finish.

A primary object of the present invention is to provide a polyimide solution having improved physical and chemical properties and a method for obtaining said solution.

It is a further object of this invention to provide a polyimide solution which is useful as a heat resistant varnish.

It is an additional object of the invention to provide a concentrated polyimide solution which is stable on storage.

It is still a further object of the invention to provide a polyimide solution having improved film forming characteristics.

Other objects and advantages of this invention will become further apparent from a reading of the specification and claims.

SUMMARY OF THE INVENTION

The objects of this invention have been achieved by providing a polyimide solution which is obtained by reacting 1,2,3,4-butane tetracarboxylic acid or a functional derivative thereof with an organic diamine in certain selected reaction solvents until 50–98 percent of the reactants are converted into the imide form. It is highly surprising that the polyimide solution of this invention in which imide formation is 50 percent or more completed and even those in which imide formation is 80–90 percent completed still have excellent soluble and exhibit long range stability when stored at temperatures from room temperatures to 100° C. The polyimide solution of this invention have excellent film forming properties and can be baked to provide superior enamel finishes.

DESCRIPTION OF THE PREFERRED EMBODIMENTS

As the butane tetracarboxylic acid reactant used in the present invention, not only butane tetracarboxylic acid per se, but also functional derivatives of butane tetracarboxylic acid such as tetracarboxylic monoanhydride, butane tetracarboxylic dianhydride and amide- or imide-forming derivatives such as esterified butane tetracarboxylic acid or amidized butane tetracarboxylic acid may be employed.

The diamine reactant employed in the present invention is represented by the formula $$H_2N - R_1 - NH_2$$

wherein $R_1$ is a divalent hydrocarbon group containing at least two carbon atoms. More specifically, $R_1$ is an aliphatic, aromatic or heterocyclic group of a divalent residue wherein two or more of the above hydrocarbon groups are bonded together by an oxygen, nitrogen, sulfur, silicone or phosphorus containing radical.

The group $R_1$ can be substituted with substituents such as hydroxy, alkyl, cycloalkyl, aryl, alkoxy, cycloalkoxy, aryl, and halogen. Certain of these substituents remarkably improve the properties of the final product especially the adhesion.

The substituents $R_1$ is preferably a carbocylic aromatic radical which may be a monocylic, bicylic, bis-cylic or a divalent radical comprised of a plurality of carbocylic aromatic rings attached through a lower alkylene (one to three carbon atoms) sulfur, nitrogen, silicone or phosporus containing radical.

As the carbocylic group $R_1$ particular attention is directed to the phenylene group, the naphthalene group, bis-phenylene and these groups which are substituted with one or more substituents such as hydroxy, lower alkyl (one–seven carbon atoms) cycloloweralkyl (three–seven carbon atoms) cycloalkyoxyl (three–seven carbon atoms) and a halogens such as fluorine, chlorine and bromine.

Representative examples of the preferred aromatic diamines are the compounds of the formula:

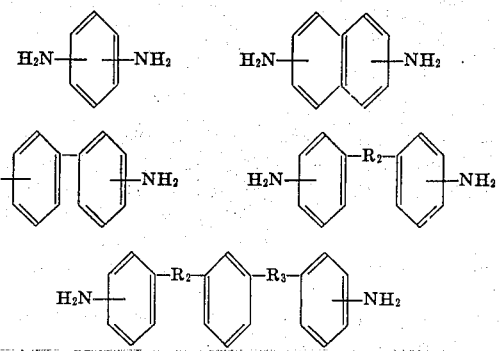

wherein $R_2$ and $R_3$ are the same or different and each represent a number selected from the group consisting of an alkylene group having one–three carbon atoms —O—, —S—, —SO$_2$—, —CONH—,

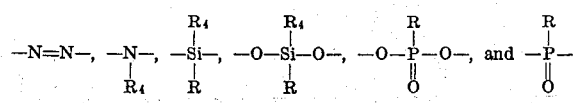

wherein $R_4$ and $R_5$ are lower akyl, lower cycloalkyl or aryl and said compounds which are further submitted with alkyl, cycloalkyl, aryl, alkoxy, cycloalkoxy and aryloxy having one–five carbon atoms and a halogen.

As diamines suitable for use in the present invention, particular attention is directed to metaphenylene diamine, paraphenylene diamine, 4,4'-diaminodiphenyl propane, 4,4'-diaminodiphenyl ethane, 4,4'-diaminodiphenyl methane, benzidine, 4,4'-diaminodiphenyl sulfide, 4,4'-diaminodiphenyl sulfone, 3,3'-diaminodiphenyl sulfone, para-bis-(4-aminophenoxy) benzene, metabis-(4-aminophenoxy) benzene, 4,4'-diaminodiphenyl ether, 1,5-diamino naphthalene, 3,3'-dimethyl-4,4'-diaminobiphenyl, 3,4'-diaminobenzanilide, 4-(para-aminophenoxy)-4-aminobenzanilide, 3,4'-diaminodiphenyl ether, 3,3'-dimethoxy benzidine, 2,4-bis(β-amino-tertiary butyl) toluene, bis (para-β-amino-tertiary butyl phenyl) ether, metaxylylene diamine, paraxylylene diamine, di (para-amino-cyclohexyl) methane, hexamethylene diamine, heptamethylene diamine, octamethylene diamine, nonamethylene diamine, 4,4'-dimethylheptamethylene diamine, 3-methoxyheptamethylene diamine, 2,11-diamino-dodecane, 1,4-diaminocyclohexane and their mixtures thereof. In addition, these diamines may be conjointly used with a small amount of the corresponding triamine and tetramine compounds.

An important aspect of the present invention is the selection of the solvent used as the reaction media in which polymerization reaction is conducted. As the reaction media specific attention is directed to the phenol type compounds, nitrobenzenes, pyridines, quinolines, N-alkyl lactans, anilines, cyanobenzenes and cycloalkanoes.

The reaction media may be any of the various solvents included in the general classes of solvents noted above providing it doesn't have any substitutant which adversely affect the polymerization reaction. The solvent can have, for example, lower alkyl or halogen substituents. As specific compounds which are especially useful in this invention, particular attention is directed to phenol, o-, m- and p- cresole, o- and p-nitrobenzene, o- and p- nitrotoluene, o- and p-nitrochlorobenzene, o- and p- nitroanisole, pyridine α-, β-or γ pic-oline, quinoline, 4-ethyl pyrrolidone, N-methyl pipiperidone, N-methyl caprolactam, N-methyl aniline, benzonitrile o- and p- cyano- to luene, cyclohexamone and cycloheptanone.

The concentration of the reactants in the polymerization mixture should be 10–90 percent by weight, and preferably 30–70 percent by weight.

The butane tetracarboxylic acid reactant and the diamine reactant are preferably employed in equimolar amounts. However, an excess of several mol percent of either reactant may be employed.

The polymerization temperature should be at least 100° C and more preferably from 150° to 300° C with temperatures from 175° C to the boiling point of the reaction mixture giving the optinum results.

By carrying out the reaction under the foregoing conditions especially by distilling off of water produced by the reaction it is possible to obtain a high molecular weight polyimide solution.

In order to obtain a polyimide solution having a high inherent viscosity, it is preferable to start the reaction with the concentration of the reactants being 60–75 percent and gradually dilute the reactants as the reaction proceeds.

By using organic bases such as triethylamine, tributyl amine, triethanolamine, or tripropanolamine, as the catylst for accelerating the polymerization reaction it is possible to carry out the reaction at lower concentrations and temperatures. The amount of catylst employed should be at least 0.01 percent by weight with at least 0.5 percent by weight based on the weight of the monomeric reactants being required to obtain optinum results.

The final reaction product is a solution of the polyimide polymer in the reaction solvent and should have an η(intr) of at least 0.1, and more preferably at least 0.2 with about 50 percent to about 98 percent of imide rings closed. The product in this state can be used as a paint, for impregnation and film making, The solvent is removed by heating to form a heat resistant polymer. This polymer is then heated to a temperature at least 120° C, preferably 190°–400° C to complete the condensation and ring closure reaction and thereby form the tenacious heat resistant polymer of this invention having a high degree of polymerization.

The polyimide solution composition of the present invention may be used as such as a heat resistant varnish or as an adhesive. In addition the polyimide solution composition of the present invention exhibits expecially advantageous characteristics as a baking paint when blended with various kinds of pigments, when applied as an insulation film on electric cable, or when used to make reinforced shaped articles.

When using the polyimide solution of the present invention as an adhesive, it is applied to the surface of the material to be bonded and the solution dried to make a 1–50, and preferably 3–30 micron thick coating. The coated surface is brought into contact with another similarly treated surface and if necessary, pressure of several g/cm² to 100 kg/cm² preferably 10g–100 kg/cm² is applied to the surface in contact and the composite is heat treated at a temperature within the range of 200°–400° C for several seconds to several hours, preferably 1 minute to 1 hour to complete the cure of the polyimide adhesive.

Certain polyimide and polyamide resins have been previously used as coating for electrical cables. However, the insulated electric cable obtained by using the polyimide solution of this invention to make the coating are superior to the prior art electrical cables especially in mechanical properties which has been the greatest short coming of the conventional electric cable coatings. The coatings of this invention perform well in the cable forming operations and results in the finished insulated cables having unprecedented superior properties.

The compositions of this invention when used as varnishes have many advantages. The polyamide solutions which were applied and cured to form pyromellitimide tended to change viscosity during storage due to changes in structure. It was necessary to store these resin varnishes at a cold temperature which created considerable problems. The resin varnishes of the present invention, on the other hand, even when stored at room temperature, do not change viscosity. The improvement in storage is in itself a considerable advantage of the polyimide solution of the present invention.

When making films from the polyimide solutions this invention normally, the solutions are cast in a thin layer on a drum or belt and by heating the solvent is removed to make a self-supporting film. This film is then subjected to a heat treatment to complete cure. The compositions of the present invention exhibit remarkable film forming properties. The films are uniform in quality and transparent. The films can easily be peeled off the drum or belt. The films are completely self-supporting and do not tend to blister during drying. Excellent films are obtained by casting the solution compositions of the present invention into a self-supporting film having a residual solvent ratio of 15–45 parts by weight and then heating treating the film at a temperature within the range of 250°–300° C. Especially good results are obtained by casting the film with the polyimide solution of this invention so that the film has a residual solvent ratio of 25–45 parts by weight then subjecting the film to a first heat treatment at a temperature within the range of 160°–250° C to reduce the residual solvent ratio 5–15 parts by weight and then subjecting the film to a second heat treatment at a temperature within the range of 250°–350° C.

The residual solvent ratio as referred to herein is expresses by the following:

$$\frac{\text{Weight of the solvent contained in high polymer solution}}{\text{Weight of the high polymer solution}} \times 100$$

In the present invention in order to quantitatively express the degree of imidization a numerical value is assigned to it, in which a value 100 percent is obtained when all possible imide rings have closed and 0 percent when none of the imide rings are closed that is when it is a polyimide.

The following examples are given by way of illustration and are not intended to limit the scope of the subjoined claims. All percentages are given are percent by weight and not percent by volume unless otherwise noted.

EXAMPLE 1

A flask equipped with a thermometer, condenser, and a stirrer was charged with 234.2 g (0.1 mole) of butane 1, 2, 3, 4-tetracarboxylic acid, 200.2 g (0.1 mole) of 4,4'-diaminodiphenyl ether and 400.0 g of N-ethyl pyrrolidone. The reaction mixture was heated to 190° C in an oil bath. As the temperature of the reaction mixture rose, the water of the reaction began to be distilled off. The temperature was maintained at 190° C and the reaction mixture was stirred for 1 hour. Thereafter, triethylene glycol monoethylether and methyl cellosolve were added to the system to dilute the resin concentration to about 40 percent. After cooling the viscosity of this solution was measured with a B-type viscosimeter, and found it to be 60 poises at 30° C. The logarithm viscosity η(intr) of the polymer was 0.25. When the degree of imidization was measured by an infrared absorption spectrum method it was found to be 78 percent. The resulting resin varnish was placed in the tank of an enamel wire furnace. The temperature at the central portion of the wire-making furnace was 380° C. The resin varnish was applied onto a soft copper wire having a diameter at of 1mm with a die and baked eight times at a linear speed of 8m/min. The resulting enamel coated electric cable had an excellent appearance. The physical and chemical characteristics of this enamel coated electric cable was compared with similar polyester coated electric coated cable and prior art aromatic polyimide (polypyromellitimide) coated electric cable. The results of this comparison are shown in Table 1.

TABLE 1

|  | Polyimide of this invention | Polyimide | Polyester |
| --- | --- | --- | --- |
| Thickness of coating (mm) | 0.045 | 0.048 | 0.040 |
| Pin Hole (number /5 cm) | 0 | 0 | 0 |
| Own diameter winding | Good | Good | Good |
| Anti-abrasion frequency (600g) | 215 | 28 | 69 |
| Softening Temperature (C°) | >300 | >300 | 270 |
| Heat impact strengthen (300° C) | 1 φ good | 1 φ good | 1 φ bad |
| Dielectric Breakdown (KV) | 12.8 | 10.2 | 17.6 |
| Thermal Degradation (200°C C×6hr) | 1 φ good | 1 φ good | 1 φ good |
| Thermal Degradation (200° C C×o6hr) | 1 φ good | 1 φ good | 3 φ good |
| Alkali Resistance (5% NaOH | Good | Softened | Good |

EXAMPLE 2

23.42 g (0.1 mole) of butane tetracarboxylic acid and 19. 83 g (0.1 mole) of 4,4'-diaminodiphenylmethane were added to 28.9 g of N-methyl pyrrolidone. The mixture was stirred and heated. As the temperature of the reaction mixture rose, the water of the reaction distilled off. When the reaction temperature reached 195° C a total of 6.5 g of water has been produced. An amount of N-methyl pyrrolidone equivalent to the amount of water distilled over was added. Thereafter 54.2 g of N-methyl pyrrolidone was added.

The viscosity of the final solution was 121 poises at 23° C and the η(intr) was 0.58. When the degree of imidization was measured by infrared quantitative analysis, it was found to be 90 percent.

A portion of this solution was so spread on a glass plate so that the thickness of a dried film would be 50 microns. The glass plate was left to stand inside a dryer at 150° C for 15 minutes and then heated to 250° C for 30 minutes. A tenacious film was obtained. The tensile strength of the film was 11.5 kg/mm² and the elongation thereof was 14 percent.

2mm thick, 25mm wide and 100mm long test panels of copper, stainless steel, iron and aluminum were coated at one end while the solution prepared above in an amount sufficient so that the film would be 15 microns thick and 2.5mm wide. The test samples were dried at 100° C for 1 hour. Two of the test panels of each of the metals noted above were bonded together with a jig under a pressure of several kg/cm² while curing the resins at 300° C for 2 hours. The tensile strength of the resulting laminates were, in the sequence of the aforesaid metals, 123, 210, 153, and 137 kg/mm². These laminates were heated at 180° C for 100 hours. The tensile strengths were evaluated at 23° C and the reaction was less than 20 percent indicating the resin is excellent in heat resistance.

EXAMPLE 3

23.42 (0.1 mole) of butane tetracarboxylic acid and 19.83 g of (0.1 mole) 4,4'-diaminodiphenylmethane were added to 86.5 percent of paracresole, and the mixture was stirred and heated. 5.5 g of water was distilled over by the time the reaction temperature reached 190° C. An amounts of paracresole equivalent to amounts of water distilled over was added. The reaction was continued at the same temperature and stirred for 4 hours. The viscosity of the reaction product was 80 poises at 23° C and the η(intr) thereof was 0.23.

By methods similar to that disclosed in Example 2, this solution was applied to wire and the coating baked at 300° C for 2 minutes to obtain an enamel coated copper wire. This coating has a smooth appearance and when it was heated at 200° C for 24 hours and even when it was wound around a copper wire of the same diameter, the coating did not crack.

EXAMPLE 4

23.4 g (0.1 mole) of 1, 2, 3, 4-butane tetracarboxylic acid and 19.8 g (0.1 mole) of 4, 4'-diamina diphenylmethane were added to 43.3 go of benzonitrile and the mixture was stirred and heated. 6 g of water distilled out by the time the reaction temperature reached 180° C. An amount of benzonitrile equivalent to the water distilled out was added. The reaction systems were stirred and heated at 180° C and thereafter 21.5 g of benonitrile was added as a diluent.

The viscosity of the solution was 1,730 poises at 23° C and the η(intr) was 0.77. The degree of imidization was measured by infrared quantitative analysis and found to be 80 percent.

This solution was so spread on a glass plate in an amount that the thickness of a resulting film would be 50 microns. The glass plate was left to stand inside a dryer at 150° C for 15 minutes and then heated at 250° C for 2 hours. A tenacious film was obtained. The characteristics of this film were as follows. The tensile strength was 11.3 kg/cm², the elongation was 12.1 percent, the initial modulus of elasticity was 295 kg/mm², the dielectric constant (IKC) was 3.9 at room temperature and 3.4 at 200° C, the volume resistivity of 8×10¹². Ω cm at 200° C and a dielectric breakdown voltage of 12.9 KV/0.1 mm. The film was superior in its high temperature characteristics. When the film was heated at 220° C for 200 hours the decrease in weight was only 3.1 percent and the physical characteristics did not substantially change.

EXAMPLE 5

23.4 g (0.1 mole) of 1, 2, 3, 4-butane tetracarboxylic acid and 19.8 g (0.1 mole) of 4, 4'-diaminodiphenylmethane were added to 28.8 g of cyclohexanone were mixed and 1.3 of diethanolamine was added as a reaction acceleration catalyst. The reaction mixture was stirred and heated to 155° C. The viscosity of the final solution was greater than 20,000 poises at 23° C and when it η(intr) was measured, it was found to be 0.24. The degree of imidization was found to be 73 percent. 35 g of N-methyl pyrrolidone was added to the copper wire having a diameter of 1mm so that the thickness of the coating would be 5–6 microns and the coated wire was baked for 2 minutes at 280° C. The heat treatment was repeated eight times. The enamel coating on the copper wire electric cable was 4.5 microns thick. When this enamel coated copper was heated at 200° C for 6 hours and even when it was wound around a copper wire of the same diameter the coating did not crack. A coil obtained by winding the wire around was heated at 300° C for 1 hour and the coating still did not crack, showing that the coating had excellent heat resistance.

Using the above varnish a film was prepared as described in Example 1. The characteristics of the film were as follows. The tensile strength was 10.1 kg/mm², the elongation was 11.8 percent, the dielectric tangent (IKC) was 0.0038, the volume resistivity was 1×10¹⁵ Ω cm and the dielectric breakdown voltage was 11.8 KV/0.1 mm.

EXAMPLE 6

23.4 (0.1 mole) of 1, 2, 3, 4-butane tetracarboxylic acid and 19.8 g (0.1 mole) of 4,4'-diaminodiphenylmethane were added to 43.3 g (0.1 mole) of N-methylaniline and the mixture was stirred and heated. 5.5 g of water distilled out by the time the reaction temperature reached 193° C. An amount of N-methylaniline equivalent to the water distilled out was added to the reaction mixture. The reaction mixture was stirred and heated at 193° C. The viscosity of the obtained solution was greater than 20,000 poises at 23° C and when the $\eta$(intr) was measured it was found to be 0.24.

30 g of N-methyl pyrrolidone was added to dilute the solution. The solution was then spread on a glass plate in a film 50 microns thick. The glass film on the plate was heated from room temperature to 150° C in a dryer in 1 hour. The glass plate was then heated at 250° C for 2 hours and a tenacious film was obtained. The tensile strength of this film was 9.5 kg/mm$^2$ and the elongation thereof was 9 percent. When this film was heated at 220° C for 200 hours The decrease in weight was only 3.8 percent and the physical characteristics were not substantially altered.

EXAMPLE 7

Instead of benonitrile employed in Example 4, 28.8 g of nitrobenzene, 43.2 g of o-nitrochlorobenzene, 43.2 g of o-nitroanisole and 28.8 g of quinline representives were prepared. Each mixture was reacted at 200° C for 30 minutes. The $\eta$(intr) of polyimides solutions were 0.5, 0.35, 0.46, respectively.

EXAMPLE 8

93.67 (0.1 mole) of 1, 2, 3, 4-butane tetracarboxylic acid and 79.32 g (0.1 mole) of 4, 4'-diaminodiphenyl methane were added to 74.2 g of N-methyl pyrrolidone. The mixture was stirred and heated and 18 g water was distilled out by the time the reaction temperature reached 150° C. An amount of N-methylpyrrolidone equivalent to the amount of water distilled out was added. The viscosity of the final solution was 41 poises at 23° C and the $\eta$(intr) was 0.22.

A glass cloth (plain fabric), (thickness of 0.18 mm) was impregnated with this solution so that the solids content would be 80 percent based on the weight of the cloth. The cloth was dried at 140° C for 1 hour to remove the solvent. Twelve similar prepregs were overlapped and inserted between press plates which were preheated to 300° C. The buildup was compressed slightly and heated for 5 minutes. Thereafter prepreg plies were compressed with a pressure of 100 kg/mm$^2$ at 300° C for 5 minutes. The cured laminates had a bond strength of 40–45 kg/mm$^2$, a water absorption of 0.7 percent and an insulation resistance of $7\times10^{14}\Omega$. When the laminate was heated at 250° C for 10 days, the decrease in weight was below 1.5 percent and the flexural strength was 30–35 kg/mm$^2$. When plies the overlapped prepreg was inserted between stainless steel plates and hot pressed at 300° C for 5 minutes with a pressure of 600 kg/mm$^2$ a laminate was obtained having a bond strength of 210 kg/mm$^2$.

EXAMPLE 9

46.83 (0.1 mole) of 1, 2, 3, 4-butane tetracarboxylic acid and 39.65 g (0.1 mole) of 4, 4'-diaminodiphenyl methane was added to 57.8 g of N, N-diamethylacetamine. The mixture was heated to 160° C and 17 g of water distilled out by the time the reaction temperature reached 160° C. An amount of N, N-dimethyl acetamide equivalent to the amount of water distilled over was added. The reaction system was stirred and heated at 160° C for an additional 2 hours. The viscosity of the final solution was about 800 poises at 25° C and the $\eta$(intr) thereof was 0.13. When this solution was stirred and heated at 160° C for a further 4 hours the $\eta$(intr) lowered to 0.11.

From the solutions having $\eta$(intr) of 0.11, films were made as described in Example 1. The films were brittle. It can be seen from this example that even using the same reactants that by changing the solvent used as the reaction media completely different results are obtained. The solvent employed in the example is not one of the solvents included within the teaching of the present invention.

EXAMPLE 10

Equimolar amounts of butane tetracarboxylic acid and 4,4'-diaminodiphenylmethane were polymerized in N-methyl pyrrolidone to obtain a polymer solution whose logarithm viscosity at 30° C in N-methyl pyrrolidone was 0.56. This polymer solution was substantially a polyimide solution as was confirmed by the infrared spectrum. This polyimide solution was cast on a glass plate dried inside a hot air dryer at 130° C for various times from minutes to make seven films each having a different residual solvent ratio. The residual solvent ratio referred to herein being the parts by weight of the organic solvent per 100 parts by weight of the polymer. These films were put inside a hot air dryer at 300° C for 8 minutes. The results of measuring by antiflexural frequency and number of blisters with each film were as follows:

| Sample No: | Residual Solvent Ratio (parts. by weight) | Anti-Flexural frequency. Time | No. of blisters (No./100 cm) |
|---|---|---|---|
| 1 | 8 | 56 | 0 |
| 2 | 13 | 78 | 1 |
| 3 | 18 | 320 | 0 |
| 4 | 26 | 400 | 1 |
| 5 | 37 | 450 | 3 |
| 6 | 45 | 506 | 6 |
| 7 | 50 | 510 | 19 |

It is apparent from these results that the residual solvent ratio in a film before heat treatment greatly effects the tensile strength of the film. Unless the residual solvent ratio before heat treatment is 15 parts by weight or greater a film having satisfactory flexural resistance cannot be obtained. On the other hand, when the residual solvent ratio is too high the solvent vigorously evaporates during the heat treatment and the films blisters. When the residual solvent ratio exceeded 45 parts by weight, the number of blisters formed make the resulting film unsuitable for electric insulation since the blisters become the greatest reason for poor insulation. In order to make a commercially useful film from polyimide solution of this invention, it is indispensible that the residual solvent ratio be 15 – 45 percent before the heat treatment.

EXAMPLE 11

Equimolar amounts of butane tetracarboxylic acid and 4,4'-diaminodiphenylether were polymerized in N-methyl pyrrolidone to obtain a polymer solution having a logarithm viscosity of 30° C in N-methyl pyrrolidone of 0.70. That this polymer solution was substantially a polyimide solution was confirmed by the infrared spectrum. This solution was cast on glass plate, which was placed inside a hot dryer at 140° C to obtain about 80 micron thick self-supporting film having a residual solvent ratio of 36 parts by weight. The influence of the heat treatment on this film was determined by varying the temperature of the first heat and adjusting the time so that the solvent ratio in the film after the first treatment would be 10 percent. These films were subjected to a second heat treatment by heating them at 500° C for 5 minutes. The antiflexural frequency and number of blisters in the films were as follows:

| Sample No. | Temperature of first heat treatment (°C) | Anti-Flexural frequency (time) | No. of blisters (No./100 |
|---|---|---|---|
| 1 | 150 | 175 | 0 |

| | | | |
|---|---|---|---|
| 2 | 160 | 203 | 0 |
| 3 | 170 | 269 | 0 |
| 4 | 200 | 370 | 0 |
| 5 | 225 | 406 | 0 |
| 6 | 250 | 435 | 0 |
| 7 | 260 | 416 | 2 |

What is claimed is:

1. The polyimide solution composition obtained by reacting approximately equimolar equivalents of (a) a tetracarbonyl member selected from the group consisting of 1, 2, 3, 4-butanetetracarboxylic acid, butanetetracarboxylic monoanhydride, butanetetracarboxylic dianhydride and (b) an aromatic diamine selected from the group consisting of the compounds of the formula:

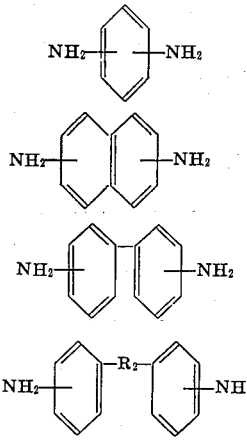

and

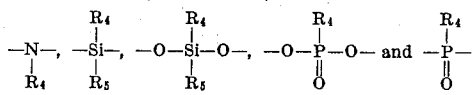

wherein $R_2$ is a member selected from the group consisting of an alkylene having 1-3 carbon atoms, —O—, —S—, —$SO_2$—, —CO—, —COHN—, —N    N—,

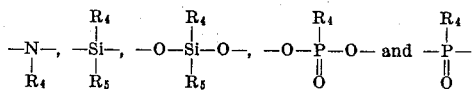

wherein $R_4$ and $R_5$ are the same as or different and each is a member selected from the group consisting of lower alkyl, cycloloweralkyl and aryl having six to 10 carbon atoms, and said aromatic amines which are substituted on the aromatic ring with one or more members selected from the group consisting of alkyl, cycloalkyl, alkoxy, cycloalkoxy, each having one–five carbon atoms in the alkyl radical, aryl having five–10 carbon atoms, florine, chlorine, bromine in a solvent selected from the group consisting of phenols, nitrobenzenes, pyridines, quinolines, N-lower alkyl lactams and cyanobenzenes, said tetracarbonyl member and aromatic diamine comprising 10–90 percent by weight of the reaction mixture, at a temperature from about 100° C to the boiling point of the reaction mixture until a polyimide solution having a 50–98 percent imidization ratio is obtained.

2. The heat resistant paint comprised of the polyimide solution composition of claim 1 and a pigment.

3. The heat resistant adhesive comprised of the polyimide solution composition of claim 1.

4. A process for the production of an insulated wire which comprises applying a polyimide solution according to claim 1 to a conductor and baking the same to complete the imidization reaction.

5. The process for the production of a heat resistant film which comprises casting the polyimide solution composition according to claim 1 to make a self-supporting film having a residual solvent ratio of 15–45 parts by weight and heat treating said film at a temperature within the range of 250°–350° C.

6. The process for the production of a heat resistant film which comprises casting the solution composition of claim 1 to make a self-supporting film having a residual solvent ratio of 25–45 parts by weight, subjecting said film to a first heat treatment at a temperature within the range of 160° C to 250° C to make the residual solvent ratio 5–15 parts by weight and further subjecting the heat treated film to a second heat treatment at a temperature within the range of 250° to 350° C.

7. A process for the production of a reinforced shaped article which comprise mixing with the solution composition of claim 1 with substrate, shaping the resulting mixture and heat treating the shaped mixture.

* * * * *